W. P. SHELHAMER.
KAFIR CORN HEADER.
APPLICATION FILED AUG. 25, 1913.
1,131,091.
Patented Mar. 9, 1915.
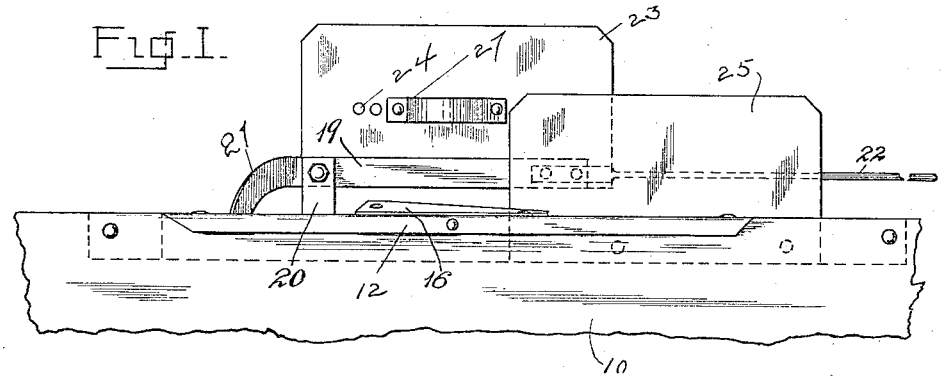
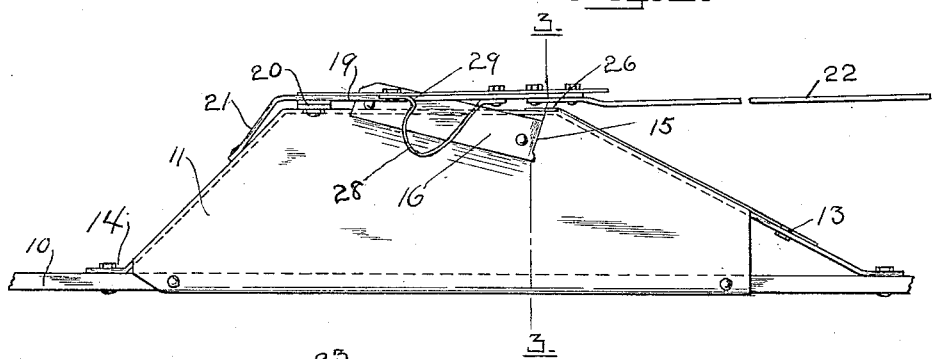
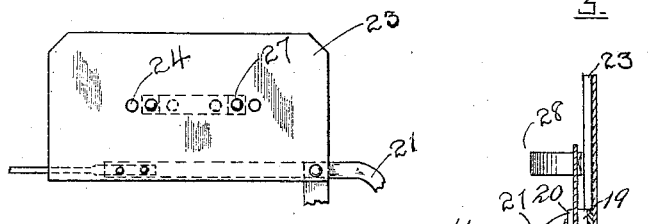
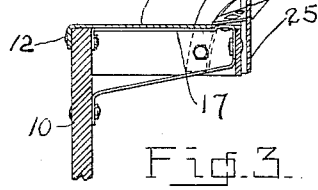
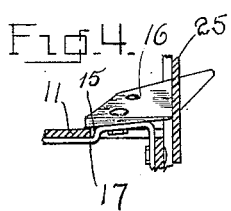
Witnesses
John F. Hardie
L. N. Gillis
Inventor
W. P. Shelhamer
By
Attorney

UNITED STATES PATENT OFFICE.

WILLIS P. SHELHAMER, OF ASHTON, KANSAS.

KAFIR-CORN HEADER.

1,131,091.  Specification of Letters Patent.  Patented Mar. 9, 1915.

Application filed August 25, 1913. Serial No. 786,527.

*To all whom it may concern:*

Be it known that I, WILLIS P. SHELHAMER, a citizen of the United States, residing at Ashton, in the county of Sumner and State of Kansas, have invented certain new and useful Improvements in Kafir-Corn Headers, of which the following is a specification.

This invention relates to harvesting devices and has special references to an attachment for wagons designed to head Kafir corn.

The principal object of the invention is to provide an improved and simplified device which can readily be attached to an ordinary farm wagon and which, when the wagon is driven through a field of Kafir corn will head the same properly so that the corn can be gathered directly into the wagon.

A second object of the invention is to provide an improved and simplified arrangement of knife for cutting the corn during the heading operation.

In the cutting of Kafir corn it is essential that a constant upward stress be maintained on the corn stalk in order to prevent breaking and injury to the head and at the same time in order to facilitate the heading operation. To this end the present invention provides an improved form of knife wherein the tension is maintained constant during the entire cutting operation while at the same time a cut directed upward and not straight across the grain is obtained.

A third object of the invention is to provide an improved means for properly guiding the ears of corn on the deck which is used to receive them, the means being of a sufficiently rigid character to effect the guiding while at the same time it is sufficiently yieldable to perform the operation without injury to the head.

With the above and other objects in view, as will be hereinafter apparent, the invention consists in general of certain novel details of construction, and combinations of parts hereinafter fully described, illustrated in the accompanying drawings, and specifically claimed.

In the accompanying drawings like characters of reference indicate like parts in these several views, and Figure 1 is a side elevation of the device. Fig. 2 is a plan thereof. Fig. 3 is a section on the line 3—3 of Fig. 2. Fig. 4 is an enlarged view of portions of Fig. 3, especially showing the knife. Fig. 5 is an enlarged detail view of the outside of the shield plate showing the means for adjusting the knocker.

This device is intended to be attached to a wagon and in order to show its application to such a vehicle there has been disclosed in the present drawings a portion of one side of a wagon box as indicated at 10.

This invention itself comprises a deck 11 having a downwardly turned inner edge 12 which fits over the wagon side 10. Extending outwardly and rearwardly from the wagon side at a point forward of the deck is a brace bar or support 13 which is continued from its outer or rear end backward parallel to the wagon side and is then inclined inwardly and attached as at 14 to the wagon side by means of a suitable bolt and nut. The deck conforms substantially in contour to this bar and is supported at its outer edge thereby. The deck however is cut away as at 15 to receive a knife blade 16 carried by braces 17, the blade being supported in such manner that it is inclined upwardly from the back to its edge and also inclined upwardly from front to rear. By reason of this peculiar arrangement of the knife blade when the latter is drawn past a stalk of corn and kept in contact therewith by suitable means hereinafter described, the corn will be cut by a shearing movement of the knife while at the same time the slant of the blade will cause the knife to cut at an inclination to instead of directly across the fibers of the stalk. Furthermore, the longitudinal inclination of the blade will tend to cause the blade to continually exert an upward stress on the stalk beneath the blade. This will aid greatly in the ease with which the stalk can be cut and owing to this will increase the length of life of the knife edge. Above this knife blade is provided a guide bar 19 which is supported on a suitable brace 20 and has its rear end inclined or curved inwardly as at 21 to form a guard for the rear of the deck. This guide bar extends over the knife and forwardly beyond the front end of said deck, there terminating in a guide finger 22.

Secured by its lower edge to the guide bar 19 above the knife blade is a shield plate 23 provided with a series of openings 24 for the purpose to be hereinafter set forth.

Secured to the forward diagonal portion of the brace 13 is a fender plate 25 which is obliquely disposed with respect to the guide bar. The rear end of this fender plate is bent inward as at 26 to lie parallel to the guide bar and in spaced relation thereto so that there is formed a guide or throat to direct the stalks of corn to the knife blade 16, the finger 22 forming one side of said guide.

Secured by means of bolts 27 which pass through the openings 24, is a knocker device consisting of a strip of sheet metal bent intermediate its ends to form a U-shaped member 28 having legs of unequal length. From these legs extend outwardly the feet 29 through which pass the bolts 27. By this means and by means of the spaced openings 24 the knocker may be attached at any desired point on the plate 23 so that as the corn passes the throat to be cut by the knife 16 the heads strike against the knocker and are deflected inwardly on to the deck within easy reach of the operator. It is to be noticed that by reason of this peculiar construction of the knocker the latter will yield slightly under the influence of the blow or contact with the head of corn while at the same time there will be sufficient stiffness in the knocker to properly guide the head on the deck. From the drawings it will be seen that the longer leg of the U is disposed in advance of the shorter leg so that the legs are inclined rearwardly from the plate 23.

In the operation of the device, after the same has been attached to a suitable wagon body by ordinary bolts and nuts, the wagon is driven through the fields where the corn is grown. The stalks of corn are guided between the members 13 and 22, into the space between the rear end of said plate 25 and the plate 23. There the corn comes in contact with the knife blade 16 and is cut as previously described. The heads strike the knocker and fall inward on the deck whence they are removed by the operator who stands in the wagon body. If any of the heads roll toward the rear of the deck, the portion 21 of the guard prevents these heads from rolling off the deck at the outer edge thereof so that the operator can quickly grasp them before they fall off, this guard directing them inward within easy reach of the operator.

As will be seen from the drawings, the knife blade and knocker are secured to parts located on opposite sides of the throat with the knife located on that side which forms the deck for the severed heads. This arrangement is of particular advantage in that the knocker, which tends to bend the stalk forces the latter into direct contact with the knife so that there is no liability of the head not being severed through a breaking of the stalk under the bending action of the knocker, the knife blade itself being the abutment against which the bending action would take place. Consequently there is a surety against choking of the device through the breaking of stalks under the action of the throat or knocker. While this construction has a direction of bend such as to tend to clamp the stalk onto the knife, this particular effect is entirely obviated through the fact that the blade itself through the upward inclination rearwardly has the effect of destroying any clamping action which the direction of bend might have, as well as tending to place the stalk under an upward stress until the head is severed. This latter forms an advantage in tending to prevent breakage of the stalks below the severing point.

Having thus described the invention what is claimed, as new, is:—

1. In a device for heading Kafir corn, a deck adapted to be secured to a wagon body, a guide member secured to the deck, said guide member and deck being positioned to form a throat for the stalks, a knocker carried by said guide member, and a knife blade carried by the deck to intersect said throat, said knife blade being inclined upwardly from front to rear, and also being upwardly inclined toward its cutting edge on a transverse section of the blade.

2. In a device for heading Kafir corn, a deck adapted to be secured to a wagon body, a guide member secured to the deck, said guide member and deck being positioned to form a throat for the stalks, a knocker carried by said guide member, and a knife blade carried by the deck to intersect said throat, said knocker extending over the knife blade to knock the stalks against the same and being adjustably mounted on said guide member in the direction of length of the throat to vary its position relative to the knife.

In testimony whereof I affix my signature in presence of two witnesses.

WILLIS P. SHELHAMER.

Witnesses:
JOHN L. ELLIOTT,
F. A. BLUE.